United States Patent
Ho et al.

(10) Patent No.: US 6,996,596 B1
(45) Date of Patent: Feb. 7, 2006

(54) FLOATING-POINT PROCESSOR WITH OPERATING MODE HAVING IMPROVED ACCURACY AND HIGH PERFORMANCE

(75) Inventors: Ying-wai Ho, Los Altos, CA (US); Xing Yu Jiang, San Jose, CA (US)

(73) Assignee: Mips Technologies, Inc., Mountain View, CA (US)

( * ) Notice: Subject to any disclaimer, the term of this patent is extended or adjusted under 35 U.S.C. 154(b) by 0 days.

(21) Appl. No.: 09/577,238

(22) Filed: May 23, 2000

(51) Int. Cl.
*G06F 7/38* (2006.01)

(52) U.S. Cl. ...................... 708/495; 708/497

(58) Field of Classification Search ......... 708/495–499, 708/205, 551, 552
See application file for complete search history.

(56) References Cited

U.S. PATENT DOCUMENTS

| | | | |
|---|---|---|---|
| 4,156,279 A | | 5/1979 | Wilhite |
| 4,511,990 A | | 4/1985 | Hagiwara et al. |
| 4,839,846 A | * | 6/1989 | Hirose et al. ............... 708/497 |
| 4,866,652 A | | 9/1989 | Chu et al. |
| 4,879,676 A | | 11/1989 | Hansen |
| 5,025,407 A | | 6/1991 | Gulley et al. |
| 5,038,313 A | * | 8/1991 | Kojima ...................... 708/525 |
| 5,159,665 A | | 10/1992 | Priem et al. |
| 5,185,713 A | | 2/1993 | Kobunaya |
| 5,206,823 A | | 4/1993 | Hesson |
| 5,220,524 A | | 6/1993 | Hesson |
| 5,257,216 A | | 10/1993 | Sweedler |
| 5,278,949 A | | 1/1994 | Thayer |
| 5,341,321 A | | 8/1994 | Karp et al. |
| 5,357,599 A | | 10/1994 | Luken |

(Continued)

OTHER PUBLICATIONS

David Stevenson et al. IEEE Standard for Binary Floating–Point Arithmetic, Jul. 26, 1985, pp. 1–19.
TMS32010 User's Guide, Texas Instruments, 1983, p. 1183.
AltiVec™ Technology Programming Environments manual, Preliminary REV 0.2, May 1998, pp. 4–16 thru 4–19 (4 pages total).
Heinrich, Joe, MIPS R4000 Microprocessor User's manual, Second Edition, MIPS Technologies, 1994, pp. 154–155, 157, 159, 161, 168, 170–171, B–13, B17, B–19, B–21, B–23, B–27, B–38, B–40 and B–62 (19 pages total). Note: The page count of this document was cited in an International Search Report from a PCT Application.
3DNow!™ Technology manual, Advanced Micro Devices, 1998, pp/ i–x and 1–62 (72 pages total).

(Continued)

*Primary Examiner*—Kakali Chaki
*Assistant Examiner*—Chat Do
(74) *Attorney, Agent, or Firm*—Dinh & Associates

(57) ABSTRACT

Floating-point units (FPUs) and processors having a "flush-to-nearest" operating mode that provides improved accuracy over a conventional "flush-to-zero" mode. The FPU or processor includes an operand processing section and an operand flush section. For each floating-point operation, the operand processing section receives and processes one or more input operands to provide a preliminary result. The operand flush section determines whether the preliminary result falls within one of a number of ranges of values and sets the preliminary result to one of a number of set values if the preliminary result falls within one of the ranges. In a specific implementation, a first range of values is defined to include values greater than zero and less than half of a minimum normalized number (i.e., $0<|y|<+a_{min}/2$), a second range of values is defined to include values equal to or greater than $+a_{min}/2$ and less than +an, (i.e., $a_{min}/2 \leq |y| < a_{min}$), and the preliminary result is set to zero if it falls within the first range and to $+a_{min}$ or $-a_{min}$ (depending on the sign bit) if it falls within the second range.

32 Claims, 7 Drawing Sheets

U.S. PATENT DOCUMENTS

| | | | |
|---|---|---|---|
| 5,359,548 A | 10/1994 | Yoshizawa et al. | |
| 5,367,650 A | 11/1994 | Sharangpani et al. | |
| 5,392,228 A | 2/1995 | Burgess et al. | |
| 5,420,966 A | 5/1995 | Silverbrook | |
| 5,420,971 A | 5/1995 | Westerink et al. | |
| 5,511,016 A * | 4/1996 | Bechade | 708/497 |
| 5,517,438 A | 5/1996 | Dao-Trong et al. | |
| 5,530,663 A | 6/1996 | Garcia et al. | |
| 5,550,767 A * | 8/1996 | Taborn et al. | 708/498 |
| 5,550,768 A | 8/1996 | Ogilvie et al. | |
| 5,553,015 A * | 9/1996 | Elliott et al. | 708/498 |
| 5,602,769 A * | 2/1997 | Yu et al. | 708/503 |
| 5,619,198 A | 4/1997 | Blackham et al. | |
| 5,631,859 A | 5/1997 | Markstein | |
| 5,652,875 A | 7/1997 | Taylor | |
| 5,671,170 A | 9/1997 | Markstein et al. | |
| 5,671,401 A | 9/1997 | Harrell | |
| 5,701,442 A | 12/1997 | Ronen | |
| 5,720,019 A | 2/1998 | Koss et al. | |
| 5,726,927 A | 3/1998 | Wolrich et al. | |
| 5,729,724 A | 3/1998 | Sharangpani et al. | |
| 5,764,555 A * | 6/1998 | McPherson et al. | 708/497 |
| 5,768,170 A | 6/1998 | Smith | |
| 5,774,709 A | 6/1998 | Worrell | |
| 5,790,827 A | 8/1998 | Leung | |
| 5,793,661 A | 8/1998 | Dulong et al. | |
| 5,805,486 A | 9/1998 | Sharangpani | |
| 5,809,294 A | 9/1998 | Ando | |
| 5,815,695 A | 9/1998 | James et al. | |
| 5,847,979 A | 12/1998 | Wong et al. | |
| 5,848,269 A | 12/1998 | Hara | |
| 5,852,726 A | 12/1998 | Lin et al. | |
| 5,862,066 A | 1/1999 | Rossin et al. | |
| 5,867,682 A | 2/1999 | Witt et al. | |
| 5,880,983 A | 3/1999 | Elliott et al. | |
| 5,880,984 A | 3/1999 | Burchfiel et al. | |
| 5,889,690 A | 3/1999 | Arakawa | |
| 5,892,698 A | 4/1999 | Naffziger | |
| 5,901,076 A | 5/1999 | Lynch | |
| 5,923,577 A | 7/1999 | Wong et al. | |
| 5,928,316 A | 7/1999 | Wong et al. | |
| 5,953,241 A | 9/1999 | Hansen et al. | |
| 5,977,987 A | 11/1999 | Duluk, Jr. | |
| 5,982,380 A | 11/1999 | Inoue et al. | |
| 5,995,122 A | 11/1999 | Hsieh et al. | |
| 5,996,066 A | 11/1999 | Yung | |
| 5,999,960 A | 12/1999 | Gerwig et al. | |
| 6,035,316 A | 3/2000 | Peleg et al. | |
| 6,065,115 A | 5/2000 | Sharangpani et al. | |
| 6,115,729 A | 9/2000 | Matheny et al. | |
| 6,169,554 B1 | 1/2001 | Deering | |
| 6,175,370 B1 | 1/2001 | Kunimatsu | |
| 6,175,851 B1 | 1/2001 | Iourcha et al. | |
| 6,175,907 B1 | 1/2001 | Elliott et al. | |
| 6,199,089 B1 * | 3/2001 | Mansingh | 708/497 |
| 6,249,798 B1 | 6/2001 | Golliver et al. | |
| 6,268,875 B1 | 7/2001 | Duluk, Jr. et al. | |
| 6,269,385 B1 * | 7/2001 | Han et al. | 708/497 |
| 6,275,838 B1 | 8/2001 | Blomgren et al. | |
| 6,285,378 B1 | 9/2001 | Duluk, Jr. | |
| 6,285,779 B1 | 9/2001 | Lapidous et al. | |
| 6,298,365 B1 | 10/2001 | Dubey et al. | |
| 6,401,108 B1 | 6/2002 | Van Nguyen | |
| 6,426,746 B2 | 7/2002 | Hsieh et al. | |
| 6,510,446 B1 * | 1/2003 | Fukagawa | 708/497 |
| 6,535,898 B1 * | 3/2003 | Yuval | 708/497 |
| 6,581,087 B1 | 6/2003 | Inoue et al. | |
| 6,631,392 B1 | 10/2003 | Kelley et al. | |
| 6,697,832 B1 | 2/2004 | Kelley et al. | |
| 6,714,197 B1 | 3/2004 | Thekkath et al. | |
| 6,732,259 B1 | 5/2004 | Thekkath et al. | |

OTHER PUBLICATIONS

Higaki et al., Four–Way VLIW Geometry Processor for 3D Graphics Applications, Dec. 1, 1999, p. 39–47.

Hughes, PL.I Programming, 1973, John Wiley & Sons, pp. 5, 15–16, 74–75, 188–189, 217, 411–416, 423–424, and 689–690.

Higaki et al., "A 2.5 GFLOPS 6.5 Million Polygons per Second 4–Way VLIW Geometry Processor with SIMD Instructions and a Software Bypass Mechanism," IEEE International Solid–State Circuits Configuration, 1999.

Ito, Masayuki et al., "Efficient Initial Approximation for Multiplicative Division and Square Root by Multiplication with Operand Modification", IEEE Transactions on Computers, vol. 46, No. 4, Apr. 1997, pp. 495–498.

Diefendorff, Keith et al., "AltiVec Extension to PowerPC Accelerates Media Processing," IEEE Micro, pp. 85–95, Mar.–Apr. 2000.

Kubosawa et al., "A 2.5–GFLOPS, 6.5 Million Polygons per Second, Four–Way VLIW Geometry Processor with SIMD Instructions and a Software Bypass Mechanism," IEEE Journal of Solid–State Circuits, vol. 34, No. 11, pp. 1619–1626, Nov. 1999.

Kubosawa et al., "Four–Way VLIW Geometry Processor for 3D Graphics Applications," Fujitsu Sci. Tech. J., 36, 1, pp 39–47, Jun. 2000 (manuscript received Dec. 1, 1999).

"MIPS Extension for Digital Media with 3D," MIPS Technologies, Inc., pp. 1–26, Dec. 27, 1996.

Thekkath et al., "An Architecture Extension for Efficient Geometry Processing," pp. 1–23, Presented at Hot Chips 11, A Symposium of High–Performance Chips, Stanford Univ. (Aug. 1999) (submitted for conference review Jul. 14, 1999).

Uhler, M., "Optimizing Game Applications for the MIPS RISC Architecture," 1999 Computer Game Developer's Conference, San Jose, CA, 14 pages (Mar. 1999) (submitted for conference review on Feb. 12, 1999).

Uhler, M., "Optimizing Game Applications for MIPS RISC Architecture," 1999 Computer Game Developer's Conference, San Jose, CA, slides 1–22 (Mar. 1999).

Kubosawa, H. et al., "A 2.5–GFLOPS, 6.5 Million Polygons per Second, Four–Way VLIW Geometry Processor with SMID Instructions and a Software Bypass Mechanism," IEEE Journal of Solid–State Circuits, IEEE, vol. 34, No. 11, pp. 1619–1626, (Nov. 1999) (appears to correspond to document AR1, Higaki, N. et al.).

Rice et al, "Multiprecision Division on an 8–Bit Processor," Computer Arithmetic, 1997 (Proceedings, 13th IEEE Symposium on Jul. 6–9, 1997), pp. 74–81).

Oberman et al., "AMD 3DNow? Technology and K6–2 Microprocessor" (presentation), Proceeding Notebook for Hot Chips 10, Aug. 16–18, 1998 (pp. 245–254).

U.S. Appl. Ser. No. 09/364,512, "Processor with Improved Accuracy for Multiply–Add Operations," Ying–wai Ho et al, filed on Jul. 30, 1999.

U.S. Appl. Ser. No. 09/363,637, "System and Method for Improving the Accuracy of Reciprocal and Reciprocal Square Root Operations Performed by a Floating–Point Unit," by Ying–wai Ho et al, filed on Jul. 30, 1999.

U.S. Appl. Ser. No. 09/364,786, entitled "Processor Having a Compare Extension of an Instruction Set Architecture," by Radhika Thekkath et al, filed on Jul. 30, 1999.

* cited by examiner $$\underbrace{\pm 1}_{310}.\underbrace{x\,x\,x\,-\,-\,x\,x}_{312} \cdot 2^{\overbrace{exp}^{314}}$$

FLOATING-POINT PROCESSOR WITH OPERATING MODE HAVING IMPROVED ACCURACY AND HIGH PERFORMANCE

CROSS-REFERENCES TO RELATED APPLICATIONS

The following related patent applications, all filed on Jul. 30, 1999, are hereby incorporated by reference in their entirety for all purposes:

U.S. patent application Ser. No. 09/364,512, entitled "Processor with Improved Accuracy for Multiply-Add Operations," by Ying-wai Ho, John Kelley, and James Jiang, filed on Jul. 30, 1999;

U.S. patent application Ser. No. 09/364,514, entitled "Floating-Point Processor with Improved Intermediate Result Handling," by John Kelley and Ying-wai Ho, filed on Jul. 30, 1999;

U.S. patent application Ser. No. 09/363,638, entitled "Method and Apparatus for Predicting Floating-Point Exceptions," by James Jiang, Ying-wai Ho, and John Kelley, filed on Jul. 30, 1999;

U.S. patent application Ser. No. 09/363,637, entitled "System and Method for Improving the Accuracy of Reciprocal and Reciprocal Square Root Operations Performed by a Floating-Point Unit," by Ying-wai Ho, Michael Schulte, and John Kelley, filed on Jul. 30, 1999;

U.S. patent application Ser. No. 10/055,346, entitled "System and Method for Improving the Accuracy of Reciprocal Square Root Operations Performed by a Floating-Point Unit." by Ying-wai Ho. Michael Schulte, and John Kelley, filed on Jan. 25, 2002, which is a divisional of 09/363,637;

U.S. patent application Ser. No. 09/364,786, entitled "Processor Having a Compare Extension of an Instruction Set Architecture," by Radhika Thekkath, Michael Uhler, Ying-wai Ho, and Chandlee Harrell, filed on Jul. 30, 1999;

U.S. patent application Ser. No. 09/364,789, entitled "Processor Having a Conditional Branch Extension of an Instruction Set Architecture," by Radhika Thekkath, Michael Uhler, Ying-wai Ho, and Chandlee Harrell, filed on Jul. 30, 1999; and U.S. patent application Ser. No. 09/364,787, entitled "Processor Having an Arithmetic Extension of an Instruction Set Architecture," by Radhika Thekkath, Michael Uhler, Ying-wai Ho, and Chandlee Harrell, filed on Jul. 30, 1999.

BACKGROUND OF THE INVENTION

The present invention relates to floating-point processors, and more particularly to floating-point processors with an operating mode that has improved accuracy and high performance.

In digital processing systems, numerical data is typically expressed using integer or floating-point representation. Floating-point representation is preferred in many applications because of its ability to express a wide range of values and its ease of manipulation for some specified operations. A floating-point representation typically includes three components: a sign bit (sign), a mantissa (mant) that is sometimes referred to as a significand, and an exponent (exp). The represented floating-point number can be expressed as $(-1)^{sign} \cdot mant \cdot 2^{exp}$. Floating-point representations are also defined by "IEEE Standard for Binary Floating-Point Arithmetic," which is referred to herein as the IEEE-754 standard (or simply, the IEEE standard) and incorporated herein by reference in its entirety for all purposes.

The IEEE standard defines representations for "normalized" and "denormalized" float-point numbers. A normalized floating-point number is characterized by a mantissa having a one to the left of the binary point and a 1.xxx--xx format, where each "x" represents one bit that is either a one or a zero. A denormalized floating-point number is characterized by a mantissa having a zero to the left of the binary point and a format of 0.xxx--xx. Floating-point numbers greater than or equal to a positive minimum representable normalized number (i.e., $y \geq +a_{min}$) and less than or equal to a negative minimum representable normalized number (i.e., $y \leq -a_{min}$) are represented using normalized numbers. Floating-point numbers in the range between the negative and positive minimum normalized numbers other than zero (i.e., $-a_{min} < y < +a_{min}$ and $y \neq \pm 0$) may be represented using denormalized numbers. Zero is represented by a mantissa having a value of zero and an exponent also having a value of zero.

Many operations can be performed on floating-point numbers, including arithmetic operations such as addition, subtraction, multiplication, division, and reciprocation. For arithmetic operations, the IEEE standard provides guidelines to be followed to generate a unique answer for each floating-point operation. In particular, the IEEE standard describes the processing to be performed on the result from a particular operation (e.g., add, multiply), the precision of the resultant output, and the data format to be used. For example, the IEEE standard defines several rounding modes available for the results from add and multiply operations, and the bit position at which the rounding is to be performed. The requirements ensure identical results from different implementations of IEEE-compliant floating-point processors.

The rounding modes defined by the IEEE standard provide improved accuracy for some operations, but are complicated to implement and also increase the processing time for an arithmetic operation. To obtain an output that fulfills IEEE rounding requirements, post-processing of a preliminary result from an arithmetic operation is typically performed. The post-processing includes possible denormalization and rounding of the preliminary result in accordance with one of the rounding modes defined by the IEEE standard. Denormalization is performed on a number having an absolute value less than $+a_{min}$ (i.e., $-a_{min} < y < +a_{min}$) to place it in a proper format such that rounding can be performed at the bit location specified by the IEEE standard. The post-processing (or more specifically, the denormalization and rounding) typically leads to increased circuit complexity and increases processing time. The IEEE rounding modes are thus generally implemented in applications requiring high accuracy.

To reduce hardware complexity and improve processing time, many floating-point processors implement an operating mode in which numbers (e.g., preliminary results) within the range of negative and positive minimum normalized numbers (i.e., $-a_{min} < y < +a_{min}$) are set or flushed to zero. The "flush-to-zero" mode is simple to implement and only marginally increases the processing time. However, the flush-to-zero mode suffers a loss in accuracy since the mantissa is flushed to zero.

For many applications such as embedded processors, reduced cost and improved processing time are desirable. For these applications, an operating mode that is simple to implement, marginally increases the processing time (if at all), and has improved accuracy over the flush-to-zero mode is highly desirable.

SUMMARY OF THE INVENTION

The invention provides an operating mode (referred to herein as a "flush-to-nearest" mode) that has improved accuracy over a conventional "flush-to-zero" mode. In one embodiment, the flush-to-nearest mode can be easily implemented with minimal implementation cost (e.g., small amount of additional hardware and/or software) and marginally increases the processing time (if at all) for an arithmetic operation utilizing conventional flush-to-zero mode. In accordance with a specific implementation of the flush-to-nearest mode, a denormalized number is either flushed to zero or set to a particular set value (e.g., $-a_{min}$, $+a_{min}$) depending on the value of the denormalized number and a threshold value. Other implementations and variants of the flush-to-nearest mode are described below.

An embodiment of the invention provides a floating-point unit (FPU) configurable to perform floating-point operations and having an operand processing section coupled to an operand flush section. For each floating-point operation, the operand processing section receives and processes one or more input operands to provide a preliminary result. The operand flush section determines whether the preliminary result falls within one of a number of ranges of values, and sets the preliminary result to one of a number of "set" values if the preliminary result falls within one of the ranges. The ranges typically cover denormalized numbers.

In a specific implementation, the operand flush section sets a positive preliminary result to one of two set values if it falls within one of two ranges of values. The first range can include values greater than zero and less than half of a positive minimum normalized number (i.e., $0<y<+a_{min}/2$), and the second range can include values equal to or greater than half of the positive minimum normalized number and less than the positive minimum normalized number (i.e., $+a_{min}/2 \leq y<+a_{min}$). The positive preliminary result can be set to zero if it falls within the first range and to $+a_{min}$ if it falls within the second range. Similar processing can be performed for a negative preliminary result such that it is flushed zero if it falls within the range ($0>y>-a_{min}/2$) and set to $-a_{min}$ if it falls within the range ($-a_{min}/2 \geq y>-a_{min}$). The ranges are typically selected for mathematical accuracy or for some other reasons. The ranges may also be selected such that the determination of whether the preliminary result falls within one of the ranges can be achieved by simply checking the exponent of the preliminary result.

The operand processing section typically includes a mantissa processing section and an exponent processing section. The mantissa processing section receives and processes one or more mantissas to provide a preliminary result mantissa, and the exponent processing section receives and processes one or more exponents to provide a preliminary result exponent. Depending on whether the result of the floating-point operation falls within the first or second range, the preliminary result mantissa can be respectively set to a first (e.g., 0.0 . . . ) or a second (e.g., 1.0 . . . ) mantissa value, and the preliminary result exponent can likewise be set to a first (e.g., 0) or a second (e.g., $E_{min}$) exponent value. Since the integer bit of the mantissa is hidden in some representations (such as for the IEEE standard), the action to set the mantissa to 0.0 . . . or 1.0 . . . may be omitted.

Another embodiment of the invention provides a floating-point processor that includes a memory unit, an instruction dispatch unit, and a floating-point unit (FPU). The memory unit stores instructions and (possibly) operands for floating-point operations. The instruction dispatch unit retrieves instructions from the memory unit and provides the instructions to the FPU. In accordance with the received instructions, the FPU performs a floating-point operation on one or more input operands to provide a preliminary result, which is flushed to zero if it falls within a first range of values and set to a (plus or minus) set value if it falls within a second range of values. Again, the first range may be defined to include $0<|y|<+a_{min}/2$, the second range may be defined to include $+a_{min}/2 \leq |y|<a_{min}$, and the set value may be selected to be $+a_{min}$ or $-a_{min}$ depending on whether the preliminary result is positive or negative, respectively. Again, the ranges are typically selected for mathematical accuracy and may also be selected such that the determination on whether the preliminary result falls within the first or second range can be made by simply checking the exponent of the preliminary result.

The FPU and floating-point processor described above typically include additional units to further process the operands. The FPU and floating-point processor can be incorporated within a microprocessor or other hardware structure, and can also be described and/or implemented using hardware design languages (e.g., Verilog).

Yet another embodiment of the invention provides a method for performing a floating-point operation. In accordance with the method, one or more input operands for the floating-point operation are received and processed to provide a preliminary result. A determination is then made whether the preliminary result falls within a first or second range of absolute values, which can be defined as described above. The preliminary result is flushed to a first value (e.g., zero) if falls is within the first range and set to a second value (e.g., $+a_{min}$, $+a_{min}$) if it falls within the second range. Again, the determination on whether the preliminary result falls within the first or second range may be made by checking the exponent of the preliminary result. Various features described above also apply.

The invention also provides computer program products that implement or are used to design and manufacture various embodiments of the invention. The invention further provides computer data signals embodied in a transmission medium and comprised various embodiments of the invention.

The foregoing, together with other aspects of this invention, will become more apparent when referring to the following specification, claims, and accompanying drawings.

DESCRIPTION OF THE SPECIFIC EMBODIMENTS

Figure 1:
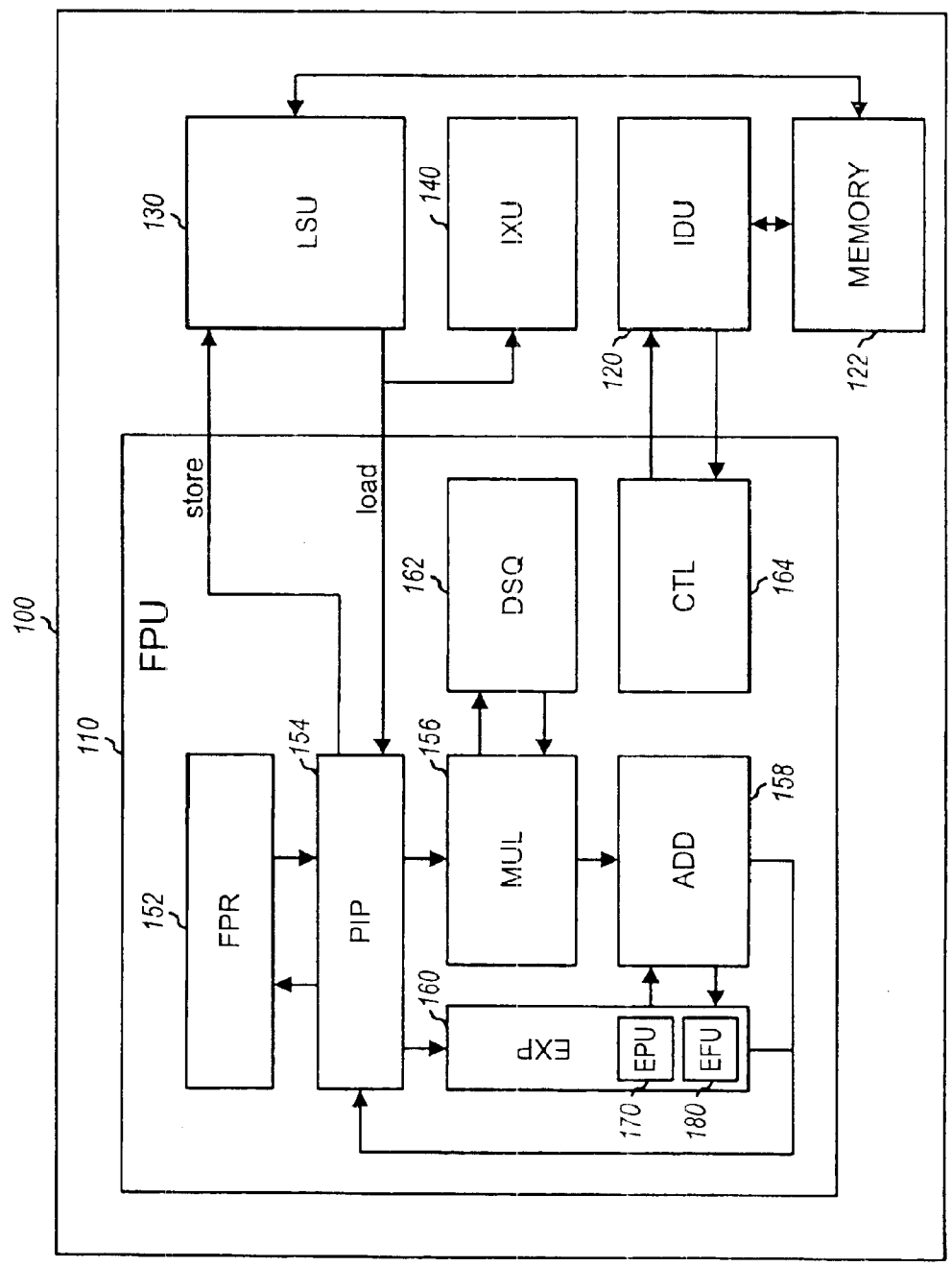
FIG. 1 is a block diagram of an embodiment of a processor that incorporates the operating mode of the invention.

FIG. 1 is a block diagram of an embodiment of a processor 100 that incorporates the operating mode of the invention. Processor 100 includes a floating-point unit (FPU) 110, an instruction dispatch unit (IDU) 120, a memory 122, a load store unit (LSU) 130, and an integer execution unit (IXU) 140. FPU 110 implements a floating-point instruction set and performs floating-point computations, as directed by IDU 120. IDU 120 decodes a sequence of instructions, dispatches floating-point instructions to FPU 110, and keeps track of the state of each dispatched floating-point instruction, resource and register dependencies, and the possibility of bypassing a resultant operand to the next FPU instruction. LSU 130 interfaces with other elements (i.e., internal or external to processor 100) and exchanges data with FPU 110. For example, operands are loaded from LSU 130 to FPU 110 and results are provided from FPU 110 to LSU 130, IXU 140 performs integer computations, and is able to exchange data with FPU 110.

In the embodiment shown in FIG. 1, a memory unit 122 couples to IDU 120 and provides instructions (and possibly operands) for FPU 110. Memory unit 122 can be a random access memory (RAM), a read only access memory (ROM), a Flash memory, or other type of memory. Memory unit 122 may be located within processor 100 (as shown in FIG. 1) or external to processor 100.

FIG. 1 also shows a block diagram of a specific embodiment of FPU 110, which includes a floating-point register file (FPR) 152, a floating-point pipe file (PIP) 154, a floating-point multiplier (MUL) 156, a floating-point adder (ADD) 158, a floating-point exponent unit (EXP) 160, a floating-point divide/square-root unit (DSQ) 162, and a floating-point control unit (CTL) 164. The functions performed by these units are briefly described below.

FPR 152 includes a number of read ports and a number of write ports. The read ports can be configured to read, for example, up to three operands for an arithmetic operation and one operand for a store operation. The write ports can be configured to write, for example, one operand for an arithmetic operation or a load operation.

PIP 154 couples to FPR 152 and also interfaces with LSU 130 and IXU 140. For each instruction, PEP 154 selects and receives operands from FPR 152, a load pipe file, a result pipe file, or a ROM. PIP 154 then unpacks the received operands (e.g., from an IEEE-compliant format) into an internal data format recognized and operable by the processing units within FPU 110. PIP 154 also packs the results from FPU 110 into a data format (e.g., IEEE-compliant format) required by the external circuitry and provides the packed results to FPR 152.

MUL 156 couples to PIP 154 and executes floating-point multiply instructions as well as the multiply portion of compound instructions such as a multiply-add (MADD) instruction. MUL 156 receives the mantissas of two operands from PIP 154. In an embodiment, MUL 156 is implemented with a multiplier array that generates a set of sum and carry outputs having full precision. The sum and carry are provided to, and combined in a carry-propagate adder (CPA) to generate a precise, unrounded resultant mantissa. The lower bits of the resultant mantissa are logically combined to form a "sticky" bit that, in combination with the round bit and the current rounding mode, are used to generate rounding information to be sent to a subsequent rounding unit within MUL 156. MUL 156 is described in further detail below.

ADD 158 couples to MUL 156 and PIP 154. ADD 158 executes floating-point add and subtract instructions as well as the add portion of compound instructions such as MADD. ADD 158 receives two operands and performs floating-point magnitude addition/subtraction using, for example, a prescale adder (PSA) operated in parallel with a massive cancellation adder (MCA). The final output is selected from one of the adders and provided to PIP 154 for storage.

In an implementation, selection of which adder to use is based upon the exponent difference of the subject operands and the first few bits of the mantissas of such operands (e.g., the integer bit(s) and the most significant bit of the fractional portion). In a specific implementation, the PSA is always used for addition and selectively used for subtraction when the result is guaranteed to be no less than 0.1000000 before rounding and normalization, and the MCA is selectively used for subtraction when the result is guaranteed to be less than 1.0 and may have a large number of leading zeros before rounding and normalization. Operands that satisfy both conditions may be processed by either the PSA or MCA. Often, this selection criteria results in selection of the PSA for additions and subtractions when the difference between operand exponents is greater than two, and selection of the MCA for subtractions when the difference between operand exponents is less than or equal to two.

EXP 160 couples to PIP 154 and ADD 158. EXP 160 receives the exponents of the operands from PIP 154, estimates an output exponent based on the operation being performed and the exponents of the operands, and adjusts the estimated output exponent based on the rounding and normalization performed on the mantissa (e.g., by MUL 156 and ADD 158). EXP 160 may also perform other functions such as overflow/underflow prediction and checks.

In an embodiment, EXP 160 includes an exception prediction unit (EPU) 170 that functions to generate an exception prediction signal when there is a possibility that an arithmetic computation performed by FPU 110 would cause an overflow or underflow exception. The exception prediction signal is provided to CTL 164 (not shown in FIG. 2), which reports the exception to IDU 120. IDU 120 then initiates or directs the required responsive processing. For example, upon receiving the exception prediction signal, IDU 120 can cause other processing units within processor 100 to temporarily halt operation. If it later turns out that the computation does not actually cause an overflow or underflow exception, IDU 120 is so notified, and the other processing units resume operation. EPU 170 is described in detail in the aforementioned U.S. patent application Ser. No. 09/363,638.

In accordance with the invention, EXP 160 further includes an exponent flush unit (EFU) 180 that functions to set the exponent to one of a set of values, based on the value of the preliminary result from an arithmetic operation. EFU 180 implements the exponent portion of the flush-to-nearest mode of the invention and possibly other operating modes (e.g., flush-to-zero, IEEE-compliant modes, and so on). EFU 180 is described in further detail below.

DSQ 162 couples to MUL 156 and operates on the mantissas for divide and square-root instructions. DSQ 162 is designed to implement a particular algorithm (e.g., a radix-2 SRT or a radix-4 SRT algorithm).

CTL 164 is the control unit for FPU 110. CTL 164 receives floating-point instructions and directs the operation of various units within FPU 110 to generate the proper output. CTL 164 also receives the exception prediction signal from EPU 170 and, responsive to the signal, initiates or directs the required processing by other units.

Figure 2:
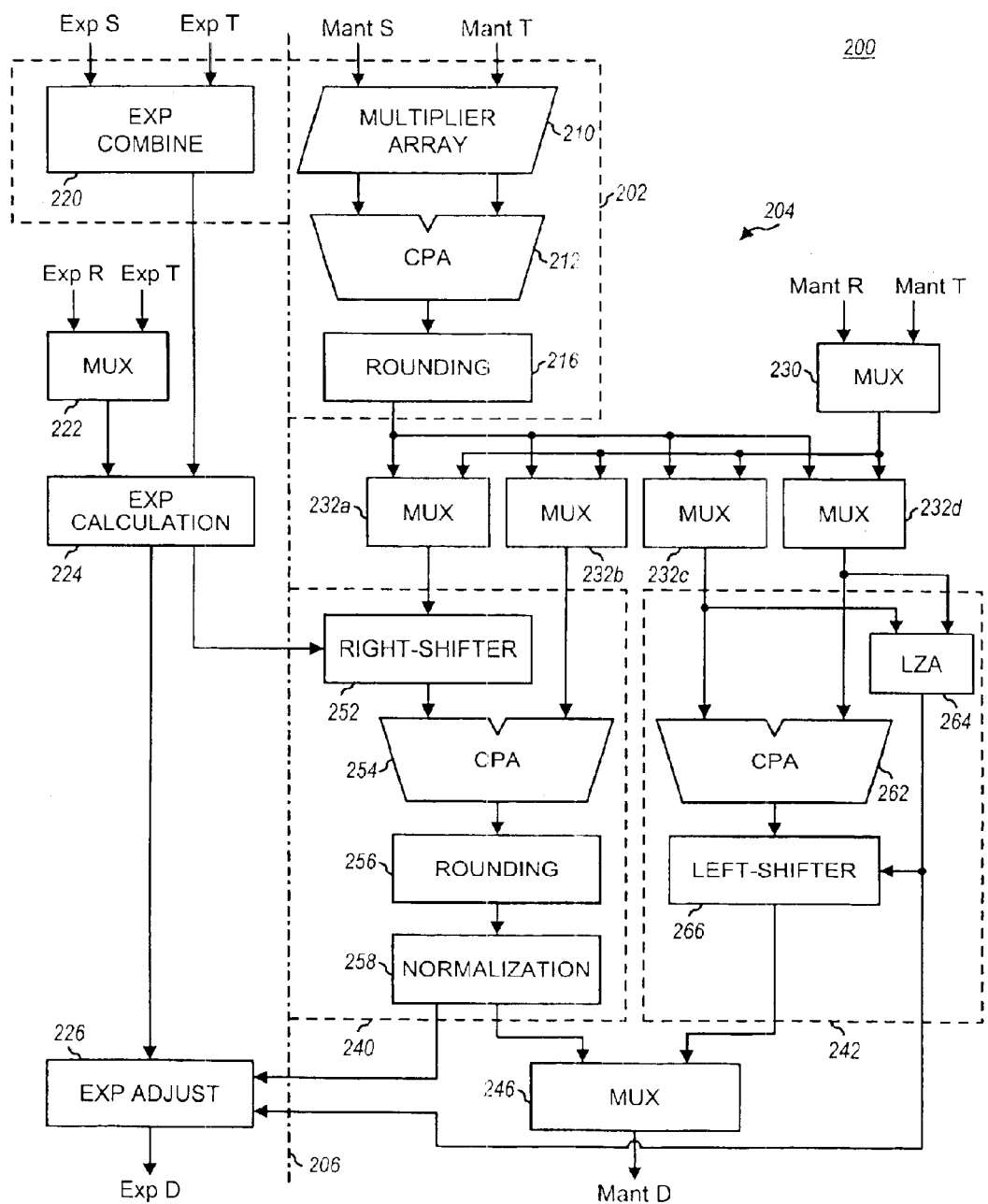
FIG. 2 is a block diagram of an embodiment of a portion of a floating-point unit (FPU) within the processor of FIG. 1.

FIG. 2 is a block diagram of an embodiment of a floating-point unit (FPU) 200 that is capable of performing add/subtract, multiply, and multiply-add (Madd) operations, and at least a portion (e.g., exponent computation) of divide, reciprocal, and square root operations. FPU 200 depicts a portion of FPU 110 shown in FIG. 1, and includes a multiplier unit 202 coupled to an adder unit 204. Support circuitry, such as that shown in FIG. 1, is not shown in FIG. 2 for simplicity.

In the implementation shown in FIG. 2, multiplier unit 202 unit includes a multiplier array 210, a carry-propagation adder (CPA) 212, a rounding unit 216, and an exponent combination unit 220. Adder unit 204 includes the remaining units shown in FIG. 2. FPU 200 includes several features that increase accuracy, simplify the hardware design, and improve operational performance, as described below.

At any given moment, FPU 200 can be configured to perform one of at least three different operations including addition/subtraction, multiplication, and Madd. These operations are expressed by the following:

$$Fd = Fs \pm Ft,$$

$$Fd = Fs \cdot Ft, \text{ and}$$

$$Fd = \pm((Fs \cdot Ft) \pm Fr),$$

where Fd is the resultant output and Fr, Fs, and Ft are three input operands. The Madd operation can be further decomposed into the following operations and their corresponding names:

| | |
|---|---|
| Fd = (Fs · Ft) + Fr, | MADD |
| Fd = (Fs · Ft) − Fr, | MSUB |
| Fd = −((Fs · Ft) + Fr), | N MADD |
| Fd = −((Fs · Ft) − Fr), | N MSUB, |

As shown in FIG. 2, the mantissas, Mant S and Mant T, for two operands are provided to multiplier array 210. Multiplier array 210 can implement, for example, a Booth or modified Booth algorithm, and can include partial product generation logic and a number of carry-save adders. The partial product generation logic produces partial products based on the mantissas. The carry-save adders add a number of partial products together and send the outputs to other carry-save adders in a tree-like fashion until only two numbers are left, the final sum and carry. In a specific implementation, the carry-save adders take in four terms and combine them into two, but other configurations are possible.

Multiplier array 210 thus multiplies the two operands and provides the product in sum-and-carry format to CPA 212. CPA 212 combines the sum and carry and provides the resultant mantissa to rounding unit 216 that processes the mantissa based on a specified operating mode of FPU 200. The operation of rounding unit 216 is further described below. The processed mantissa comprises the output mantissa from multiplier unit 202.

The exponents, Exp S and Exp T, of the two operands are provided to exponent combination unit 220 that combines the exponents for a multiply operation. The combined exponent from unit 220 comprises the output exponent from multiplier unit 202.

For improved performance (i.e., faster operating speed), adder unit 204 includes a prescale adder (PSA) 240 and a massive cancellation adder (MCA) 242 operated in parallel. Depending on the characteristics of the operands, the output from either PSA 240 or MCA 242 is selected.

To perform a floating-point addition, the mantissas of the two operands are typically aligned by shifting one of the mantissa and adjusting its exponent until the exponents of the two operands are equal. The mantissas are then combined (e.g., added or subtracted), and the resultant mantissa is normalized. The number of shifts prior to the combination can be large (e.g., when adding a large number with a small number), and the number of shifts after the combination can also be large (e.g., when subtracting two operands having similar magnitudes). PSA 240 and MCA 242 are designed to efficiently process most input conditions, including these two extreme conditions.

For PSA 240, the mantissa from rounding unit 216 is provided to MUXes 232a and 232b. The mantissas for operands R and T are provided to a MUX 230 that selects one of the mantissas, based on the operation to be performed, and provides the selected mantissa to MUXes 232a and 232b. MUX 232a selects the mantissa of the smaller operand and provides the selected mantissa to a right-shift unit 252. MUX 232b selects the mantissa of the larger operand and provides the selected mantissa to a CPA 254.

The exponents of operands R and T (Exp R and Exp T, respectively) are provided to a MUX 222 that selects one of the exponents based on the operation to be performed. The selected exponent from MUX 222 and the combined exponent from unit 220 are provided to an exponent calculation unit 224 that determines the difference between the two exponents, $E_{diff}$, and a preliminary result exponent, $E_{pre}$. Determination of the preliminary result exponent is dependent upon the arithmetic equation being performed, and is further described in the aforementioned U.S. patent application Ser. No. 09/363,638. The preliminary result exponent (e.g., the larger exponent when performing an add operation) is provided to an exponent adjustment unit 226 and the exponent difference is provided to right-shift unit 252 that shifts the mantissa of the smaller operand to the right by the indicated exponent difference. The shifted mantissa is provided to CPA 254 that combines the two mantissas and provides a combined mantissa to a rounding unit 256. Rounding unit 256 rounds the combined mantissa and provides the rounded mantissa to a normalization unit 258.

The mantissa from CPA 254 can be in a normalized format (i.e., 01.xxx--xxxx) or a non-normalized format (e.g., 1xx.xxx--xxxx, 1x.xxx--xxxx, or 0.1xxx--xxxx). Normalization unit 258 normalizes the result to the 01.xxx--xx format by performing a 1-bit or 2-bit right-shift or left-shift, if necessary. The exponent is adjusted by exponent adjustment unit 226, as necessary, based on the normalization performed by normalization unit 258.

MCA 242 includes a CPA 262, a leading zero anticipator (LZA) 264, and a left-shift unit 266. For MCA 242, the mantissas from rounding unit 216 and MUX 230 are provided to MUXes 232c and 232d. MUXes 232 facilitate a small shift of one of the mantissas, based on the exponent difference, to align the mantissas. MUXes 232 are also used to select one of the mantissas for inversion in subtraction operations (the inverter is not shown in FIG. 2 for simplicity). The outputs from MUXes 232c and 232d are provided to CPA 262 and LZA 264. CPA 262 combines the two mantissas and provides a combined mantissa to left-shift unit 266. LZA 264 anticipates the number of leading zeros in the resultant mantissa, based on the input operands. The output from LZA 264 is encoded into a control signal indicative of the number of shifts for left-shift unit 266. The control signal is also provided to exponent adjustment unit 226 to adjust the exponent.

The outputs from normalization unit 258 and left-shift unit 266 are provided to a MUX 246 that selects the output from PSA 240 or MCA 242 as the output mantissa from FPU 200. The adjusted exponent from unit 226 comprises the output exponent from FPU 200. The operation of FPU 200 is further described in the aforementioned U.S. patent application Ser. No. 09/364,514.

Figures 3, 4A:
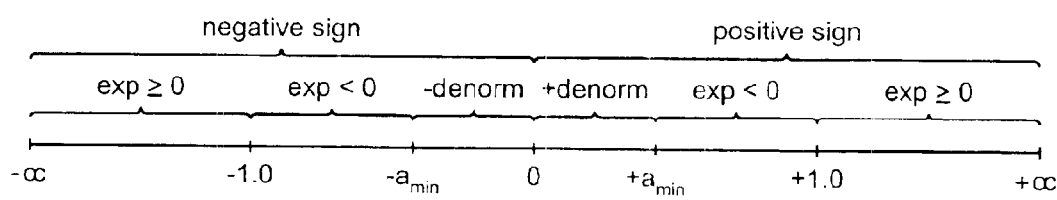
FIG. 3 shows a representation of a normalized floating-point number.
FIG. 4A is a diagram of a line that graphically represents all real numbers.

FIG. 3 shows a representation of a normalized floating-point number. The representation includes a sign bit 310, a mantissa (mant) 312, and an exponent (exp) 314. A floating-point number (y) can be expressed as:

$$y = (-1)^{sign} \cdot mant \cdot 2^{exp} \qquad \text{Eq. (1)}$$

A normalized floating-point number is represented by a mantissa having a one (1) to the left of the binary point (i.e., the integer portion of the mantissa) and a 1.xxx--xx format, where each "x" represents one bit that is either a one or a zero. As defined by the IEEE standard, the fractional portion "xxx--xx" represents 23 bits after the binary point for a normalized single-precision number and 52 bits after the binary point for a normalized double-precision number. The normalized mantissa has a range of between 1.0 and 2.0 (i.e., $1.0 \leq mantissa < 2.0$).

The IEEE standard defines the representation for floating-point numbers. For normalized numbers, the IEEE standard mandates storing only the fractional portion of the mantissa (i.e., the "xxx--xx" portion in FIG. 3). The leading one (1) to the left of the binary point is implicit and not stored.

FIG. 4A is a diagram of a line that graphically represents all real numbers. It should be noted that this line representation is not drawn to scale. Generally, real numbers range from negative infinity ($-\infty$) to positive infinity ($+\infty$). In the line representation shown in FIG. 4A and for the floating-point expression shown in equation (1), numbers greater than 0.0 (i.e., y>0.0) are represented by a positive sign bit (i.e., sign=0) and numbers less than 0.0 (i.e., y<0.0) are represented by a negative sign bit (i.e., sign=1). Numbers having an absolute value greater than 1.0 (i.e., |y|>1.0) are represented by a positive exponent (i.e., exp$\geq$0) and numbers having an absolute value less than 1.0 (i.e., |y|<1.0) are represented by a negative exponent (i.e., exp<0).

For floating-point representations having finite resolution (e.g., 32-bit single-precision and 64-bit double-precision floating-point numbers), only numbers having absolute values within a particular range of values can be represented as normalized numbers using the expression shown in equation (1). This range is defined by a positive maximum normalized value, +$a_{min}$, and a positive minimum normalized value, +$a_{min}$. For single-precision numbers, +$a_{min}$ is slightly smaller than $2^{+128}$ and +$a_{min} = 2^{-126}$. Some numbers having absolute values between zero and the positive minimum normalized value (i.e., 0.0<y<+$a_{min}$) can be represented as denormalized numbers, which are further described below. Special representations are used for zero (0.0) and for some numbers greater than the maximum normalized value (e.g., positive infinity and negative infinity).

Table 1 lists the representations for some of the normalized and denormalized numbers. As suggested in Table 1, successively smaller normalized numbers are obtained by decrementing the mantissa from 1.111--11 down to 1.000--00. The next successively smaller normalized number is obtained by resetting the mantissa to 1.111--11 and decrementing the exponent by one. This continues until the mantissa is 1.000--00 and the exponent is at the minimum value, Fin, used for representing normalized numbers. The maximum denormalized number is defined by a mantissa of 0.111--11 and an exponent of $E_{min}$. Similarly, successively smaller denormalized numbers are obtained by decrementing the mantissa from 0.111--11 down to 0.000--01.

TABLE 1

Floating Point Number Representation

| Number | Floating Point Representation |
|---|---|
| ±infinity | $\pm 1.111$–11 · $2^{Emax+1}$ |
| ±max normalized number(±$a_{max}$) | $\pm 1.111$–11 · $2^{Emax}$ |
| . | . |
| . | . |
| . | . |
| ±min normalized number(±$a_{min}$) | $\pm 1.000$–00 · $2^{Emin}$ |
| ±max denormalized number | $\pm 0.111$–11 · $2^{Emin}$ |
| . | . |
| . | . |
| ±min denormalized number | $\pm 0.000$–01 · $2^{Emin}$ |
| ±zero (±0) | $\pm 0.000$–00 · $2^0$ |

As noted above, the IEEE standard defines a number of "rounding" modes for converting a preliminary result from an arithmetic operation (which is usually represented in an internal data format) into an IEEE-compliant final result. The rounding modes define by the IEEE standard include the "round-to-nearest", "round-to-zero", "round-to-positive-infinity", and "round-to-negative-infinity" modes.

In the round-to-nearest mode, the preliminary result is calculated to be the closest representable floating-point number, which can be either bigger or smaller than the preliminary result. In the round-to-zero mode, the preliminary result is calculated to be the nearest representable floating-point number toward zero. Thus, the preliminary result is calculated to be the next smaller floating-point number if it is a positive number, and calculated to be the next larger floating-point number if it is a negative number. In the round-to-positive-infinity mode, the preliminary result is calculated to be the next larger floating-point number regardless of whether it is a positive or negative number. And in the round-to-negative-infinity mode, the preliminary result is calculated to be the next smaller floating-point number, again regardless of whether it is a positive or negative number.

The IEEE standard defines performing the rounding at a particular bit position of a floating-point number. This requirement ensures a consistent result from different implementations of a floating-point processor. To obtain an IEEE-compliant result, the preliminary result is normalized and then rounded.

Many conventional floating-point processors also support a "flush-to-zero" operating mode in which denormalized preliminary results are flushed to zero. The processing for a flush-to-zero operation is typically simpler to implement than the processing for a rounding operating and can also be executed in less time. However, the flush-to-zero mode typically has accuracy loss as a result of the flush. Many embedded processors implement the flush-to-zero mode (and not the rounding modes described above) because the loss in accuracy can be tolerated and the reduced complexity and improved operating speed are highly desirable.

The invention provides an operating mode that has improved accuracy over the flush-to-zero mode. In one embodiment, the operating mode of the invention can be easily implemented with minimal implementation cost (e.g., small amount of additional hardware and/or software) and marginally increases the processing time (if at all) for an arithmetic operation utilizing conventional flush-to-zero mode. In accordance with this operating mode, which is also referred to as a "flush-to-nearest" mode, a denormalized number is either flushed to zero or set to a particular "set" value depending on the value of the denormalized number and a threshold value. The flush-to-nearest mode of the invention can provide more accurate final results for at least some arithmetic operations, as described below. In a preferred embodiment, the "set" values are predetermined and maintained in a conventional format (e.g., hard wired as a constant value, stored in a register as a changeable value, etc.) to avoid repeated calculations.

In a specific implementation of the flush-to-nearest mode, the threshold value is selected-to be the mid-point between zero and the minimum normalized number (i.e., threshold $=\pm a_{min}/2$) and the set value is selected to be the minimum normalized number (i.e., set $=\pm a_{min}$). In this implementation, a positive denormalized number is flushed to zero if it is greater than zero and less than $+a_{min}/2$ (i.e., $0<y<+a_{min}/2$), and set to $+a_{min}$ if it is equal to or greater than $+a_{min}/2$ and less than $+a_{min}$(i.e., $+a_{min}/2 \leq y<+a_{min}$). Similarly, a negative denormalized number is flushed to zero if it is less than zero and greater than $-a_{min}/2$ (i.e., $0>y>-a_{min}/2$), and set to $-a_{min}$ if it is equal to or less than $-a_{min}/2$ and greater than $-a_{min}$(i.e., $-a_{min}/2 \geq y>-a_{min}$).

In other implementations of the flush-to-nearest mode, other threshold values (e.g., $\pm a_{min}/4$, $\pm a_{min}/8$, and others) and other set values (e.g., $\pm a_{min}/4$, $\pm a_{min}/4$, and others) may be used. These other threshold and set values may provide better results for some applications. In these implementations, a denormalized number is flushed to zero if it falls within a first range of values and set to the set value if it falls within a second range of values. For example, a positive denormalized number may be flushed to zero if it is greater than zero and less than $+a_{min}/4$ (i.e., $0<y<+a_{min}/4$), and set to $+a_{min}$ if it is equal to or greater than $+a_{min}/4$ and less than $+a_{min}$(i.e., $+a_{min}/4 \leq y<+a_{min}$).

Figure 4B:
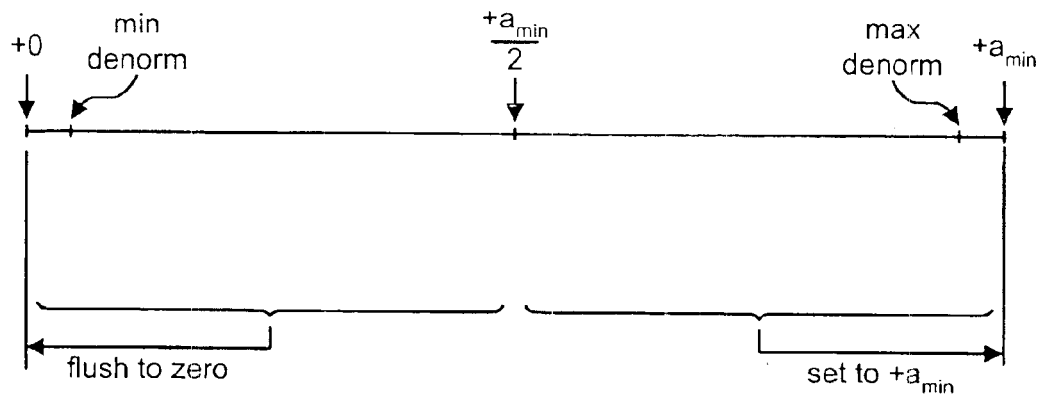
FIG. 4B is a diagram of a line that graphically represents the range of positive denormalized numbers.

FIG. 4B is a diagram of a line that graphically represents the range of positive denormalized numbers, which is flanked on the left side by positive zero (+0.0) and on the right side by the positive minimum normalized number, $+a_{min}$, which is also referred to as positive min-norm. The mid-point between zero and $+a_{min}$ is shown by a hashed mark between these end points. As shown in FIG. 4B, a denormalized number greater than zero and less than $+a_{min}/2$ is flushed to zero and a denormalized number equal to or greater than $+a_{min}/2$ and less than $+a_{min}$ is set to $+a_{min}$.

The FPU can be designed to support a combination of operating modes. Table 2 lists some of the operating modes and their attributes. The FPU can be selected to operate in accordance with one of the supported operating modes, which can be selected based on, for example, a status register such as that described in the aforementioned U.S. patent application Ser. No. 09/364,786.

TABLE 2

| Operating Mode | Implementation Complexity | Acccuracy |
| --- | --- | --- |
| IEEE | moderate | good |
| Flush-to-Zero | simple | poor |
| Flush-to-Nearest | simple | improved over the Flushed-to-Zero |

Figure 5:
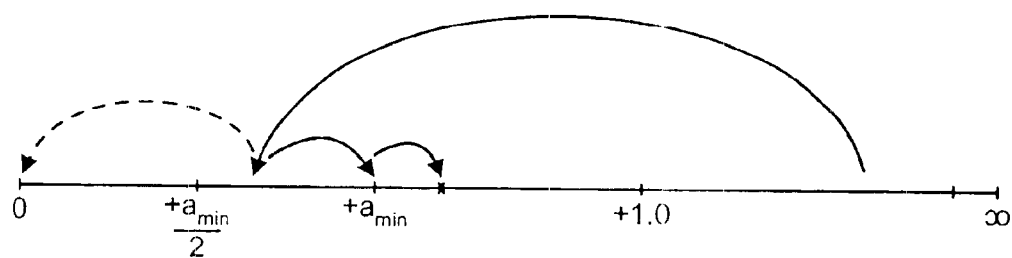
FIG. 5 is a diagram that graphically represents a reciprocal operation for some large numbers.

FIG. 5 is a diagram that graphically represents a reciprocal operation for some large numbers. In a reciprocal operation, a number greater than 1.0 is transformed into a number smaller than 1.0. In accordance with the IEEE standard and for a single-precision floating-point number, an exponent range of 0 through +127 is used to represent numbers greater than 1.0 and an exponent range of −1 through −126 is used to represent numbers less than 1.0. The range of representable normalized numbers greater than 1.0 is thus greater than the range of normalized numbers less than 1.0. Consequently, some large normalized numbers near positive infinity will map to denormalized numbers in a reciprocal operation.

For a reciprocal operation implemented using a Newton-Raphson algorithm, a number of iteration is performed to achieve the final result. For some large normalized numbers, the results of the first iteration will map to the denormalized number range. When operating in the conventional flush-to-zero mode, these intermediate results from the first iteration are flushed to zero, as indicated by the dashed line, and accuracy is lost. However, when operating in the flush-to-nearest mode of the invention, intermediate results equal to or greater than $+a_{min}/2$ and less than $+a_{min}$ will be set to $+a_{min}$ and intermediate results equal to or less than $-a_{min}/2$ and greater than $-a_{min}$ will be set to $-a_{min}$. Subsequent iterations may then be able to provide the reciprocal results (e.g., a result of x as shown in FIG. 5).

Thus, the flush-to-nearest mode of the invention increases the accuracy of at least some arithmetic operations (e.g., reciprocal, multiply, divide, and so on) in which the results of the operations may be denormalized numbers.

For the specific implementation of the flush-to-nearest mode described above in which the threshold value is $\pm a_{min}/2$ and the set value is $\pm a_{min}$, accuracy increases by 50% on the average over the conventional flush-to-zero mode.

The threshold value and set value are typically selected to provide mathematical accuracy, and may further be selected such that the flush-to-nearest mode of the invention can be implemented with small implementation cost and minor (if any) degradation in operating speed. For example, if the threshold value is selected to be related to the minimum normalized number by a power of two (e.g., $\pm a_{min}/2$), the determination for whether a preliminary result is equal to or greater than the threshold value can be easily achieved. Referring back to Table 1, the positive minimum normalized number is expressed as:

$$+a_{min}=1.000\text{--}00\cdot 2^{Emin}.$$

A positive threshold value of $+a_{min}/2$ can thus be expressed as:

$$+a_{min}/2=1.000\text{--}2^{Emin-1}.$$

From the above expressions, it can be observed that a positive preliminary result having a value equal to or greater than $+a_{min}/2$ and less than $+a_{min}$(i.e., $+a_{min}/2 \leq y<+a_{min}$) will have an exponent value of $E_{min}-1$. Thus, to determine whether the preliminary result is equal to or greater than $+a_{min}/2$ and less than Gamins it is only necessary to check the exponent of the preliminary result to determine whether it is equal to $E_{min}-1$. There is no need to check the mantissa of the preliminary result. A negative preliminary result differs from a positive preliminary result only in the sign bit, and can be checked in similar manner as for a positive preliminary result. From the above description, it can be observed that the selection of a threshold value of $\pm a_{min}/2$ corresponds to a detection of $E_{min}-1$ in the preliminary result exponent. $E_{min}-1$ is thus an exponent comparison value to be used to determine whether a positive preliminary result is equal to or greater than $+a_{min}/2$ and less than $+a_{min}$. A different threshold value may correspond to a detection of a different exponent value. For example, selection of a threshold value of $+a_{min}/4$ corresponds to a detection of $E_{min}-2$ (and possibly $E_{min}-1$) in the exponent. By selecting the threshold value to be a power of two smaller than $a_{min}$ (e.g., $+a_{min}/2$, $+a_{min}/4$, and so on) the detection process for one end of the range (e.g., $+a_{min}/2 \leq y$) is greatly simplified since only the exponent needs to be checked and the mantissa can be ignored. However, other threshold values not related to $+a_{min}$ by a power of twos can also be used and are within the scope of the present invention. Proper selection of the equality (i.e., $+a_{min}/2 \leq y$, and not $+a_{min}/2 < y$) also greatly simplifies the detection process.

Thus, by selecting the threshold value to be $+a_{min}/2$ and the upper end of the range to be $+a_{min}$, where the threshold value and the upper end is related by a factor of two, and by properly choosing the equality conditions (e.g., $+a_{min}/2 \leq y < +a_{min}$), the detection of whether a positive preliminary result falls within the range can be made by simply comparing the exponent of the positive preliminary result against one exponent comparison value (e.g., $E_{min}-1$). These design conditions greatly simplify the implementation of the flush-to-nearest mode of the invention. However, these design conditions are not required by the invention.

The specific implementation of the flush-to-nearest mode described above uses one threshold value (e.g., $\pm a_{min}/2$) and one set value (e.g., $\pm a_{min}$). Generally, the invention can be extended to include any number of threshold values and any number of set values. Specifically, N threshold values in combination with zero (or some other value) can be used to define N+1 ranges of values. The preliminary result can be flushed to zero or set to one of N set values, depending on whether the preliminary result falls into one of the N+1 ranges. If zero is considered one of the set values, the result is thus effectively be set to one of N+1 set values, depending on which one of the N+1 ranges it falls into. For example, a flush-to-nearest quartile mode can be implemented in which a preliminary result is set to the nearest quartile (e.g., 0, $\pm a_{min}/4$, $\pm a_{min}/2$, $\pm a_{min}/4$, or $\pm a_{min}$). The implementation for the flush-to-nearest quartile will be different than that described above for the flush-to-nearest 0 or $\pm a_{min}$, and may entail checking the exponent as well as the mantissa of the preliminary result (e.g., for $\pm 3a_{min}/4$). Other variations of the flush-to-nearest mode of the invention can be contemplated and are within the scope of the present invention.

Figure 6:
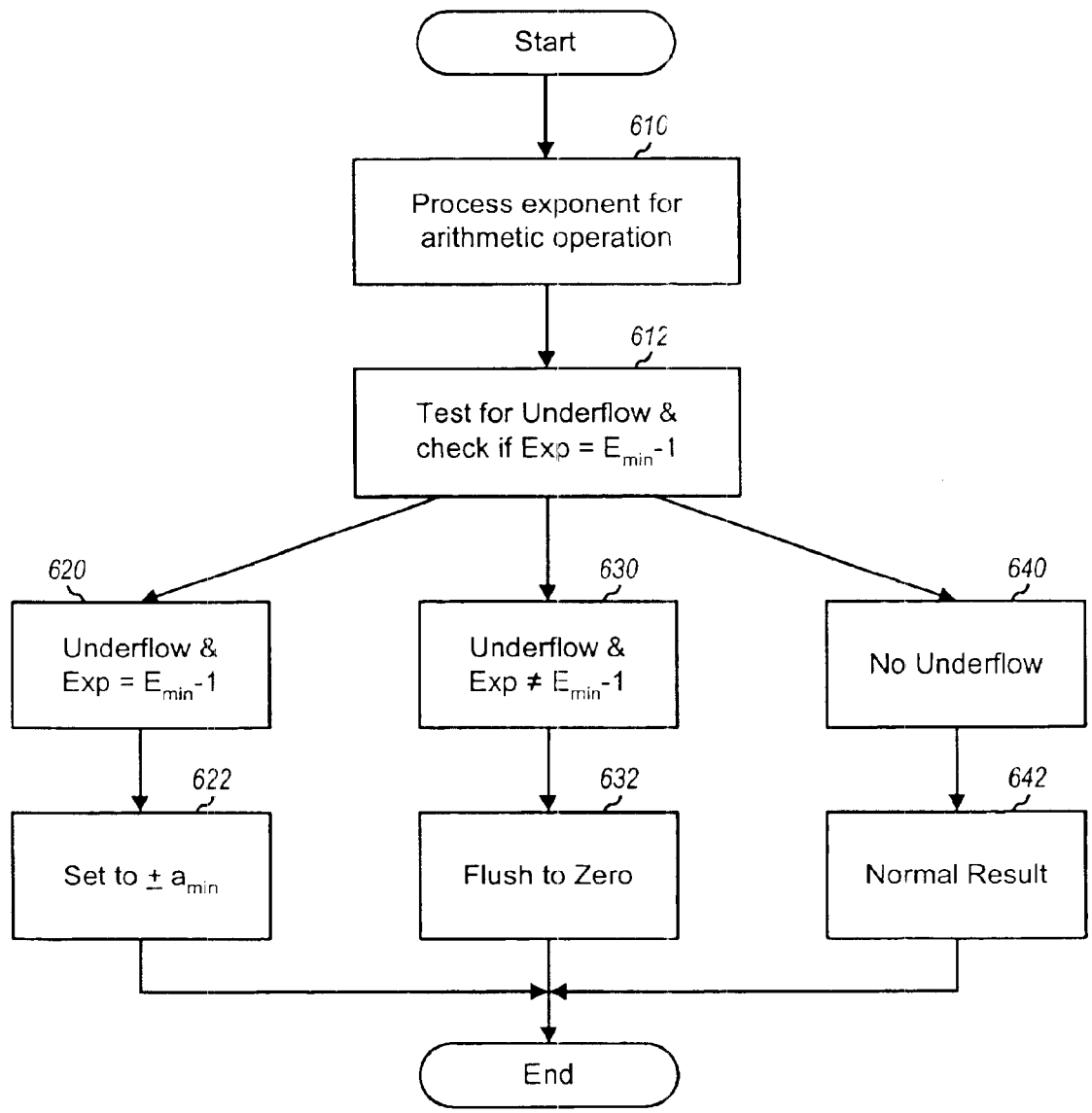
FIG. 6 is a flow diagram of a specific implementation of the flush-to-nearest mode of the invention.

FIG. 6 is a flow diagram of a specific implementation of the flush-to-nearest mode of the invention. This flow diagram is for the specific implementation described above in which a preliminary result is flushed to zero if its absolute value is within the range of $0 < |y| < +a_{min}/2$, and set of $+a_{min}$ or $-a_{min}$, depending on the sign bit, if its absolute value is within the range of $+a_{min}/2 \leq |y| < +a_{min}$. Initially, at step 610, the exponent(s) for a particular arithmetic operation are processed in the normal manner to determine a preliminary result. A test is then performed to detect underflow and to determine whether the exponent of the preliminary result is equal to $E_{min}-1$, at step 612. Underflow can be predicted based solely on the one or more exponents of the one or more operands for the arithmetic operation being processed. For example, underflow can be predicted based on one exponent for a square root or reciprocal operation, two exponents for an add, subtract, multiply, or divide operation, and three exponents for a multiply-add operation. Underflow prediction is described in detail in the aforementioned U.S. patent application Ser. No. 09/363,638.

Based on the result of the underflow test and the exponent check performed in step 612, a set of determinations is made. If an underflow is detected and the exponent is equal to $E_{min}-1$, at step 620, the preliminary result is set to $\pm a_{min}$, at step 622. If an underflow is detected and the exponent is not equal to $E_{min}-1$, at step 630, indicating a preliminary result having an absolute value that is less than $+a_{min}/2$, the preliminary result is flushed to zero, at step 632. Otherwise, if no underflow is detected, at step 640, the normal result is provided, at step 642.

Many of the steps shown in FIG. 6 are normally performed in floating-point processors, such as those described in the aforementioned patent application Ser. Nos. 09/363,638, 09/364,514, 09/364,512, 09/363,637, 09/364,786, 09/364,789, and 09/364,787. To implement the flush-to-nearest mode of the invention, step 612 is modified to include the check to determine whether the exponent is equal to $E_{min}-1$ and steps 620 and 622 are added. It can be noted that in these steps, only the preliminary exponent, Exp, is checked to determine whether it is equal to $E_{min}-1$. The additional steps can be easily achieved with small implementation cost and can be executed with small or no additional processing delay.

Figure 7:
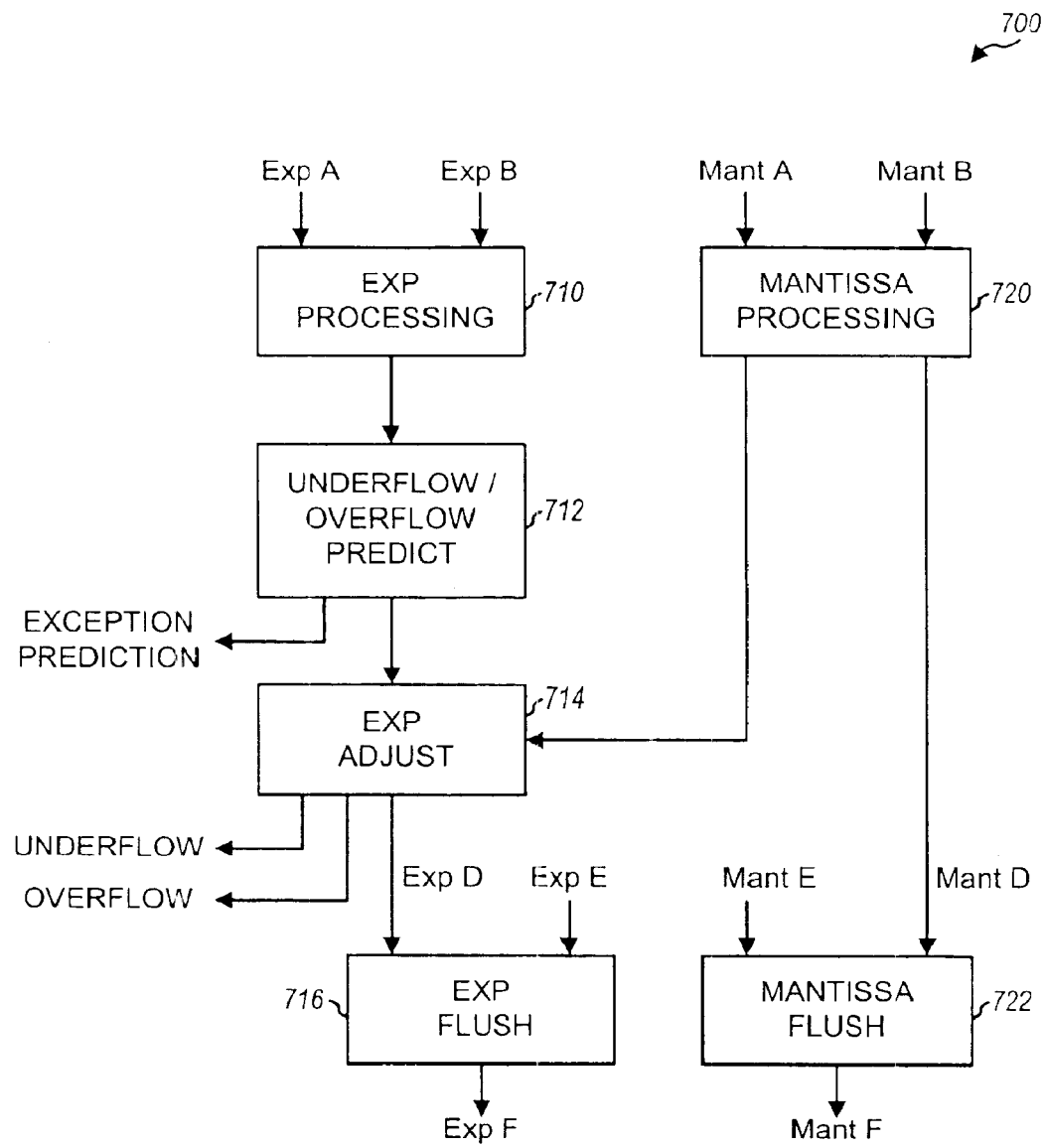
FIG. 7 is a block diagram of an embodiment of a floating-point unit that can be used to implement the flush-to-nearest mode of the invention.

FIG. 7 is a block diagram of an embodiment of a floating-point unit (FPU) 700 that can be used to implement the flush-to-nearest mode of the invention. FPU 700 includes an exponent processing section that processes the exponents of the input operands and a mantissa processing section that processes the mantissas of the input operands. In the embodiment shown in FIG. 7, the exponent processing section includes an exponent processing unit 710, an underflow/overflow prediction unit 712, an exponent adjustment unit 714, and an exponent flush unit 716. In this embodiment, the mantissa processing section includes a mantissa processing unit 720 and a mantissa flush unit 722. For simplicity, FPU 700 is shown processing two operands (e.g., for an add, subtract, multiply, or divide operation) but may be configured to process fewer operands (e.g., for a square root or reciprocal operation) or more operands (e.g., for a multiply-add operation).

FPU 700 can also be viewed as including an operand processing section coupled to an operand flush section. The operand processing section includes exponent processing unit 710, underflow/overflow prediction unit 712, exponent adjustment unit 714, and mantissa processing unit 720. The operand flush section includes exponent flush unit 716 and mantissa flush unit 722. Other embodiments of an FPU that can implement the flush-to-nearest mode of the invention can be designed and are within the scope of the present invention.

As shown in FIG. 7, the exponents of the two operands, Exp A and Exp B, are provided to exponent processing unit 710 that processes the received exponents to generate a set of intermediate exponent values. Exponent processing unit 710 generally includes exponent combination unit 220 and exponent calculation unit 224 in FIG. 2. The intermediate exponent values may include, for example, a preliminary result exponent ($E_{pre}$), an exponent difference ($E_{diff}$) between the received exponents, an overflow threshold value (OTV), and an underflow threshold value (UTV). The preliminary result exponent, E, is determined based on the type of operation being performed and the values of the received exponents, Exp A and Exp B. The preliminary result exponent, E, and the exponent difference, $E_{diff}$, are used for the mantissa processing and for the underflow and overflow exception prediction. The computations to derive the intermediate exponent values are described in further detail in the aforementioned U.S. patent application Ser. No. 09/363,638.

The intermediate exponent values are provided to underflow/overflow prediction unit 712 that, among other functions, predicts whether an underflow is likely to occur.

The preliminary result exponent, $E_{pre}$, along with a signal from mantissa processing unit 720 are provided to exponent adjustment unit 714 that adjust the exponent (e.g., by −2, −1, 0, or +1) based on the result of the mantissa processing. Exponent adjustment unit 714 generally corresponds to exponent adjustment unit 226 in FIG. 2.

The preliminary result exponent, Exp D, from exponent adjustment unit 714 and a "constant" exponent, Exp E, are provided to exponent flush unit 716. If Exp D is equal to $E_{min}-1$, indicating that the preliminary result falls within the range $+a_{min}/2 \leq |y| < +a_{min}$, then the output exponent, Exp F, is set to $E_{min}$ to set the final result to $\pm a_{min}$. Otherwise, if Exp D is less than $E_{min}-1$, indicating that the preliminary result falls within the range $0 < M < +an/2$, then the final exponent, Exp F, is set to $E_{min}-1$ to flush the output result to zero. Exp E, thus has a value of either $E_{min}$ or $E_{min}-1$ depending on whether the result is to be set to $\pm a_{min}$ or flushed to zero. Exponent flush unit 716 may further provide a status signal indicative of whether the preliminary result exponent is being flush to zero or set to $E_{min}$. The status signal is provided to, and used by, mantissa flush unit 722 to flush or set the preliminary result mantissa.

Mantissa processing unit 720 receives and processes the mantissas of the two operands, Mant A and Mant B, to generate a preliminary result mantissa, Mant D. Mantissa processing unit 720 generally includes the units to the right of line 206 in FIG. 2. The preliminary result mantissa, Mant D, is then provided to a mantissa flush unit 722 that operates on similar principle as exponent flush unit 716. Specifically, the preliminary result mantissa is flushed to a value corresponding to zero if the preliminary result falls within the range $0 < |y| < +a_{min}/2$, and set to a value corresponding to $\pm a_{min}$ if the preliminary result falls within the range $+a_{min}/2 \leq |y| < +a_{min}$. The determination to flush the mantissa or to set it to a value corresponding to $\pm a_{min}$ can be achieved using the status signal provided by exponent flush unit 716.

In FPU 700, underflow/overflow prediction unit 712 is used to provide improved performance (i.e., reduced processing delay). However, the flush-to-nearest mode of the invention can be implemented without underflow/overflow prediction unit 712, and this is within the scope of the present invention.

Figure 8:
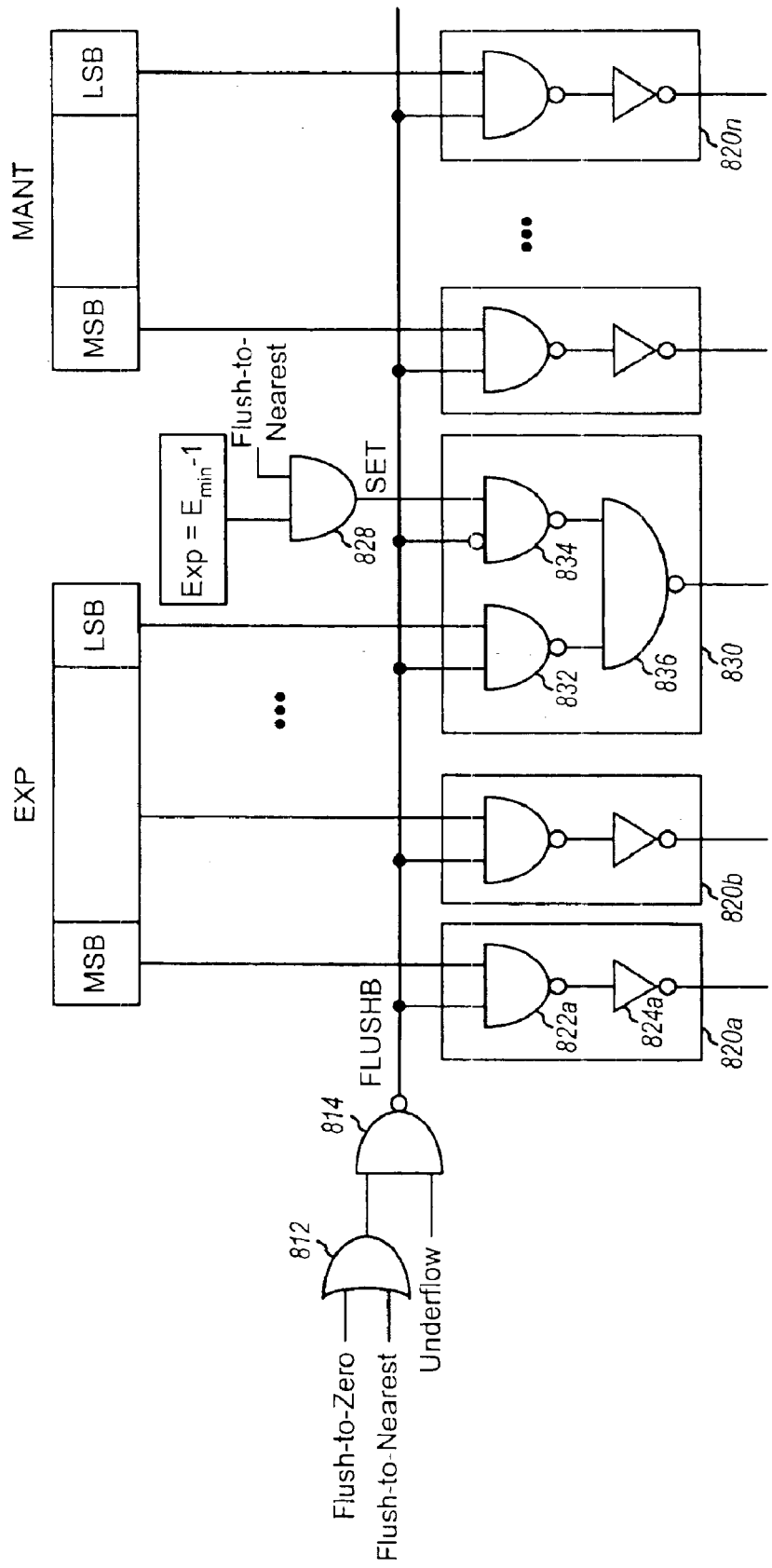
FIG. 8 is a logic diagram of a specific implementation of an exponent flush unit and a mantissa flush unit shown in FIG. 7.

FIG. 8 is a logic diagram of a specific implementation of exponent flush unit 716 and mantissa flush unit 722 in FIG. 7. A Flush-to-Zero signal indicative of the FPU operating in the flush-to-zero mode and a Flush-to-Nearest signal indicative of the FPU operating in the flush-to-nearest mode are provided to the input of an OR gate 812. The output of OR gate 812, which is logic high if the FPU is operating in either the flush-to-zero or flush-to-nearest mode, is provided to an input of an NAND gate 814. An Underflow signal from underflow/overflow prediction unit 712 is provided to the other input of NAND gate 814. The output of NAND gate 814 comprises a FLUSHB signal and is logic low if an underflow is detected and the FPU is operating in either the flush-to-zero or flush-to-nearest mode.

The FLUSHB signal is provided to one input of a number of flush circuits 820a through 820n. Each of flush circuits 820a through 820n also receives a respective bit from the exponent or the mantissa. Within flush circuit 820a, the FLUSHB signal and the received bit from the exponent or mantissa are provided to the inputs of a NAND gate 822a. The output of NAND gate 822a couples to an input of an inverter 824a, and the output of inverter 824a comprises the output bit for the exponent or mantissa. If the FLUSHB signal is logic low, indicating the need to flush the result, the output of NAND gate 822a is logic high and the output of inverter 824a is logic low. Each of flush circuits 820b through 820n are similarly configured and operated.

A signal indicative of the condition ($Exp = E_{min}-1$) and the Flush-to-Nearest signal are provided to the input of an AND gate 828. The output of AND gate 828 comprises a SET signal, which is logic high when the preliminary result is to be set to $+a_{min}$ or $-a_{min}$. The FLUSHB signal, the SET signal, and the least significant bit (LSB) of the exponent are provided to a flush/set circuit 830.

Within flush/set circuit 830, the FLUSHB signal and the exponent LSB are provided to the input of a NAND gate 832, similar to the other flush circuits 820. The output from NAND gate 832 is logic high if the exponent is to be flushed to zero.

The FLUSHB signal and the SET signal are also respectively provided to the inverting and non-inverting input of a NAND gate 834. The output from NAND gate 834 is logic low if both input conditions are true (i.e., the FLUSHB signal is logic low and the SET signal is logic high) and the exponent is to be set to $E_{min}$. The outputs from NAND gates 832 and 834 are provided to the inputs of a NAND gate 836. If the output from NAND gate 834 is logic low, the output from NAND gate 836 is forced to logic high and the exponent is set to $E_{min}$. Otherwise, the exponent LSB is flushed to zero if the FLUSHB signal is logic low, similar to the other exponent and mantissa bits. In the embodiment shown in FIG. 8, there is no need to flush the MSB of the mantissa to 0 (to flush the operand to $\pm 0.0$ or $\pm 0.0 \ldots \times 2^0$) or to set the MSB of the mantissa to 1 (to set the operand to gamin or $+1.0 \ldots \times 2^{a_{min}}$) since the integer bit in the mantissa is hidden in the IEEE standard.

As can be seen for the specific implementation shown in FIG. 8, minimum additional circuitry is required to set the preliminary result to $+a_{min}$ or $-a_{min}$.

In accordance with the IEEE standard, a single-precision floating-point number is represented by a 32-bit value comprised of a sign bit, an 8-bit exponent, and a 23-bit mantissa, and a double-precision floating-point number is represented by a 64-bit value comprised of a sign bit, an 11-bit exponent, and a 52-bit mantissa. Representations for normalized and denormalized, single and double-precision floating-point numbers are described in further detail in the aforementioned IEEE standard and in U.S. patent application Ser. No. 09/364,512.

In many floating-point processors, IEEE-compliant floating-point numbers are converted to, and processed using, an internal representation having a greater range such that large intermediate and preliminary results can be accurately represented. For example, a processor can be designed capable of internally representing and processing 12-bit exponents that can accurately represent the 8-bit single-precision and the 11-bit double-precision exponents.

Table 3 lists the true exponent values, their external representation in accordance with the IEEE standard for single-precision numbers, and their internal representation in accordance with a specific implementation using 12-bit internal exponent representation. In this implementation, the true exponent values are represented internally by inverting the most significant bit (MSB) of the external representation and sign extending the MSB. For example, for a true exponent value of zero, the single-precision IEEE representation is x7F (hex) or 0111,1111 (binary) and the internal representation is xFFF (hex) or 1111,1111,1111 (binary). Similarly, for a true exponent value of $E_{min}$, the single-precision IEEE representation is x01 (hex) or 0000,0001 (binary) and the internal representation is xF81 (hex) or 1111,1000,0001 (binary).

TABLE 3

| Exponent Value | Single-Precision External Representation | Single-Precision Internal Representation |
| --- | --- | --- |
| infinity | xFF | x07F |
| $E_{max}$ | xFE | x07E |
| 0 | x7F | xFFF |
| $E_{min}$ | x01 | xF81 |
| zero/denorm | x00 | xF80 |

For the specific internal representation described above and shown in Table 3, $E_{min}$ for single-precision floating-point numbers is represented as xF81 (hex) and $E_{min}$ for double-precision floating-point numbers is represented as xC01 (hex). For this specific implementation, a denormalized number can be determined to be equal to or greater than $+a_{min}/2$ and less than $+a_{min}$ if the internal exponent is xF80 for a single-precision floating-point number and xC00 for a double-precision floating-point number. For single-precision floating-point numbers, an underflow is detected if the exponent is xF80 or less. A check to determine whether the exponent is $E_{min}-1$ can be performed by checking whether the upper five bits are all ones for single-precision and whether the upper two bits are all ones for double-precision. Thus, for the specific implementation described above and in conjunction with the underflow detection, not all bits in the exponent need to be check to determine whether the exponent is equal to $E_{min}-1$.

For clarity, the invention has been described in the context of single-precision and double-precision floating-point representations that conform to the IEEE formats. However, the invention can be adopted for used with other floating-point representations, and this is within the scope of the invention.

The FPUs described above can be implemented in various manners. For example, the FPUs can be implemented in hardware within a digital signal processor, an application specific integrated circuit (ASIC), a microprocessor, an embedded processor, and other hardware structures.

In addition to implementations of the invention using hardware, the invention can also be embodied in a computer usable medium configured to store a computer-readable program code. The program code causes the enablement of the functions or fabrication, or both, of the invention disclosed in this specification. For example, this might be accomplished through the use of general programming languages (e.g., C, C++, and so on); hardware description language (HDL), including Verilog HDL, VHDL, AHDL (Altera hardware description language); or other programming and/or circuit (i.e., schematic) capture tools available in the art. As a specific example, the Verilog simulator "VCS v.4.1.1" by Synopsys, Inc. may be used to simulate the invention. A book entitled "A Verilog HDL Primer" by J. Bhasker, Star Galaxy Pr., 1997 provides greater detail on Verilog HDL, and is incorporated herein by reference in its entirety for all purposes. Using Verilog HDL, for example, a design may be described at a variety of levels, including switch-level, gate-level, register-transfer-level (RTL), and algorithmic level. In the program code implementation, FIGS. 2, 6, and 7 can serve as an embodiment of a flow diagram.

The program code can be disposed in any known article of manufacture containing a computer usable (e.g., readable) medium including semiconductor memory, magnetic disk, optical disc (e.g., CD-ROM, DVD-ROM, and so on), and as a computer data signal embodied in a computer usable (e.g., readable) transmission medium (e.g., carrier wave or any other medium including digital, optical, or analog-based medium). As such, the code can be transmitted over communication networks, including the Internet and intranets.

It is understood that the functions accomplished by the invention as described above can be represented in a core that can be utilized in programming code and transformed to hardware as part of the production of integrated circuits. Also, other implementations of the invention (e.g., the FPUs described above) using a combination of hardware and software are also possible. Therefore, the embodiments expressed above flat are within the scope of the invention and should also be considered protected by this patent.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. A floating-point unit (FPU) configurable to perform floating-point operations, comprising:

an operand processing section operative to, for each floating-point operation, receive and process one or more input operands to provide a preliminary result comprised of a mantissa and an exponent; and an operand flush section coupled to the operand processing section and operative to check at least the exponent of the preliminary result to determine whether the preliminary result falls within one of a plurality of ranges of denormalized values between zero and a minimum normalized floating-point number, $a_{min}$, wherein each range of denormalized values is associated with a respective set value defined by a particular exponent value and a particular mantissa value, and if the preliminary result falls within one of the plurality of ranges of denormalized values, set the preliminary result to the set value associated with the range of denormalized values within which the preliminary result falls.

2. The FPU of claim 1, wherein the operand flush section is operative to set the preliminary result to one of two set values if the preliminary result falls within one of two ranges of denormalized values between zero and the minimum normalized floating-point number, $a_{min}$.

3. The FPU of claim 1, wherein the plurality of ranges of denormalized values are selected such that a determination of whether the preliminary result falls within one of the plurality of ranges of denormalized values can be performed by checking only the exponent of the preliminary result.

4. The FPU of claim 1, wherein the plurality of ranges of denormalized values are defined by one or more threshold values that are related by factors of two.

5. The FPU of claim 1, wherein the operand flush section is operative to check a predetermined number of most significant bits (MSBs) of the exponent of the preliminary result to determine whether the preliminary result falls within the plurality of ranges of denormalized values.

6. The FPU of claim 1, and operable to perform a reciprocal operation.

7. A floating-point unit (FPU) configurable to perform floating-point operations, comprising:
an operand processing section operative to, for each floating-point operation, receive and process one or more input operands to provide a preliminary result; and
an operand flush section coupled to the operand processing section and operative to
determine whether the preliminary result falls within a first or second ranges of values, wherein the first range of values includes values greater than zero and less than half of a minimum normalized floating-point number, or $0<y<a_{min}/2$, and wherein the second range of values includes values equal to or greater than half of the minimum normalized floating-point number and less than the minimum normalized floating-point number, or $a_{min}/2 \leq y < a_{min}$, and
set the preliminary result to a first or second set value if the preliminary result falls within the first or second range of values, respectively.

8. The FPU of claim 7, wherein the preliminary result is set to zero if it falls within the first range of values and to the minimum normalized floating-point number, $a_{min}$, if it falls within the second range of values.

9. A floating-point unit (FPU) configurable to perform floating-point operations, comprising:
a mantissa processing section operative to, for each floating-point operation,
receive and process one or more mantissas for one or more input operands for the floating-point operation to provide a preliminary result mantissa,
set the preliminary result mantissa to a first mantissa value if a preliminary result for the floating-point operation, comprised of the preliminary result mantissa and a preliminary result exponent, is within a first range of denormalized values between zero and a minimum normalized floating-point number, $a_{min}$, and
set the preliminary result mantissa to a second mantissa value if the preliminary result is within a second range of denormalized values between zero and the minimum normalized floating-point number; and
an exponent processing section operative to
receive and process one or more exponents for the one or more input operands for the floating-point operation to provide the preliminary result exponent,
set the preliminary result exponent to a first exponent value if the preliminary result is within the first range of denormalized values, and
set the preliminary result exponent to a second exponent value if the preliminary result is within the second range of denormalized values.

10. The FPU of claim 9, wherein the first mantissa value and the first exponent value represent zero, and wherein the second mantissa value and the second exponent value represent the minimum normalized floating-point number, $a_{min}$.

11. The FPU of claim 9, wherein a determination of whether the preliminary result is within the first or second range of denormalized values is performed by checking the preliminary result exponent.

12. A floating-point unit (FPU) configurable to perform floating-point operations, comprising:
a mantissa processing section operative to, for each floating-point operation,
receive and process one or more mantissas for one or more input operands for the floating-point operation to provide a preliminary result mantissa,
set the preliminary result mantissa to a first mantissa value if a result for the floating-point operation, comprised of the preliminary result mantissa and a preliminary result exponent, is within a first range of values that includes values greater than zero and less than a first threshold value defined as half of a minimum normalized floating-point number, or $0<y<a_{min}/2$, and
set the preliminary result mantissa to a second mantissa value if the result is within a second range of values that includes values equal to or greater than the first threshold value and less than the minimum normalized floating-point number, or $a_{min}/2 \leq y < a_{min}$, and
an exponent processing section operative to
receive and process one or more exponents for the one or more input operands to provide the preliminary result exponent,
set the preliminary result exponent to a first exponent value if the result is within the first range of values, and
set the preliminary result exponent to a second exponent value if the result is within the second range of values.

13. A floating-point unit (FPU) configurable to perform floating-point operations, comprising:
a mantissa processing section operative to, for each floating-point operation,
receive and process one or more mantissas for one or more input operands for the floating-point operation to provide a preliminary result mantissa, and
set the preliminary result mantissa to one of a plurality of mantissa set values if a preliminary result for the floating-point operation, comprised of the preliminary result mantissa and a preliminary result exponent, falls within one of a plurality of ranges of denormalized values between zero and a minimum normalized floating-point number, $a_{min}$; and
an exponent processing section operative to
receive and process one or more exponents for the one or more input operands for the floating-point operation to provide the preliminary result exponent, and
set the preliminary result exponent to one of a plurality of exponent set values if the preliminary result falls within one of the plurality of ranges of denormalized values.

14. The FPU of claim 13, wherein the preliminary result mantissa and the preliminary result exponent are set to one of two set values depending on whether the preliminary result falls within one of two ranges of denormalized values between zero and the minimum normalized floating-point number, wherein each set value is defined by a particular exponent value and a particular mantissa value.

15. The FPU of claim 13, wherein the plurality of ranges of denormalized values are selected such that a determination on whether the preliminary result falls within one of the plurality of ranges of denormalized values can be made by checking the preliminary result exponent against one or more exponent comparison values.

16. A floating-point unit (FPU) configurable to perform arithmetic operations, comprising:
an exponent processing unit operative to receive and process one or more exponents for one or more input operands for each arithmetic operation to provide a preliminary result exponent partially indicative of a result of the arithmetic operation; and
an exponent flush unit coupled to the exponent processing unit, the exponent flush unit operative to receive and compare the preliminary result exponent to at least one exponent comparison value greater than zero and less than an exponent value, $E_{min}$, for a minimum normalized floating-point number, and set the preliminary result exponent to one of a plurality of exponent set values based on results of the comparison between the preliminary result exponent and the at least one exponent comparison value.

17. A floating-point unit (FPU) configurable to perform arithmetic operations, comprising:

an exponent processing unit operative to receive and process one or more exponents for one or more input operands for each arithmetic operation to provide a preliminary result exponent partially indicative of a result of an arithmetic operation; and an exponent flush unit coupled to the exponent processing unit and operative to receive and compare the preliminary result exponent to an exponent comparison value, $E_{min}-1$, that is equal to one less that an exponent value, $E_{min}$, for a minimum normalized floating-point number, and set the preliminary result exponent to one of a plurality of exponent set values based on results of the comparison between the preliminary result exponent and the exponent comparison value.

18. The FPU of claim 17, wherein the preliminary result exponent is set to $E_{min}$ if it is equal to the exponent comparison value of $E_{min}-1$.

19. The FPU of claim 17, wherein the preliminary result exponent is set to an exponent value for a floating-point zero if it is less than the exponent comparison value of $E_{min}-1$.

20. A floating-point processor comprising:

a memory unit operative to store instructions;

an instruction dispatch unit operative to retrieve instructions from the memory unit; and a floating-point unit (FPU) coupled to the instruction dispatch unit and operative to perform a floating-point operation on one or more input operands to provide a preliminary result comprised of a mantissa and an exponent, check at least the exponent of the preliminary result to determine whether the preliminary result falls within a first or second range of denormalized values between zero and a minimum normalized floating-point number, $a_{min}$, flush the preliminary result to zero if the preliminary result falls within the first range of denormalized values, and set the preliminary result to a set value if the preliminary result falls within the second range of denormalized values, wherein the set value is defined by a particular exponent value and a particular mantissa value.

21. The floating-point processor of claim 20, wherein a determination on whether the preliminary result falls within the first or second range of denormalized values is made by checking only the exponent of the preliminary result.

22. A floating-point processor comprising:

a memory unit operative to store instructions;

an instruction dispatch unit operative to retrieve instructions from the memory unit; and a floating-point unit (FPU) coupled to the instruction dispatch unit and operative to perform a floating-point operation on one or more input operands to provide a preliminary result, wherein the preliminary result is flushed to zero if it falls within a first range of values and set to a set value if it falls within a second range of values, wherein the first range of values includes values greater than zero and less than half of a minimum normalized floating-point number, or $0 < y < a_{min}/2$, and wherein the second range of values includes values equal to or greater than half of the minimum normalized floating-point number and less than the minimum normalized floating-point number, or $a_{min}/2 \leq y < a_{min}$.

23. A method for performing a floating-point operation, comprising:

receiving one or more input operands for the floating-point operation;

processing the one or more input operands to provide a preliminary result comprised of a mantissa and an exponent;

checking at least the exponent of the preliminary result to determine whether the preliminary result is within a first or second range of denormalized values between zero and a minimum normalized floating-point number, $a_{min}$;

setting the preliminary result to a first set value if the preliminary result is within the first range of denormalized values, the first set value being defined by a first exponent value and a first mantissa value; and setting the preliminary result to a second set value if the preliminary result is within the second range of denormalized values, the second set value being defined by a second exponent value and a second mantissa value.

24. The method of claim 23, further comprising:

checking the exponent of the preliminary result to determine whether the preliminary result falls within the first or second range of denormalized values.

25. The method of claim 23, wherein the first set value is zero and the second set value is the minimum normalized floating-point number.

26. A method for performing a floating-point operation, comprising:

receiving one or more input operands for the floating-point operation;

processing the one or more received operands to provide a preliminary result;

determining whether the preliminary result is within a first or second range of values, wherein the first range of values includes values greater than zero and less than half of a minimum normalized floating-point number, and wherein the second range of values includes values equal to or greater than half of the minimum normalized floating-point number and less than the minimum normalized floating-point number;

setting the preliminary result to a first value if it is within the first range of values; and setting the preliminary result to a second value if it is within the second range of values.

27. A computer program product for performing a floating-point operation, comprising:

code that directs reception of one or more input operands for the floating-point operation;

code that processes the one or more input operands to provide a preliminary result comprised of a mantissa and an exponent;

code that checks at least the exponent of the preliminary result to determine whether the preliminary result is within a first or second range of denormalized values between zero and a minimum normalized floating-point number, $a_{min}$;

code that sets the preliminary result to a first set value if the preliminary result is within the first range of denormalized values, the first set value being defined by a first exponent value and a first mantissa value;

code that sets the preliminary result to a second set value if the preliminary result is within the second range of denormalized values, the second set value being defined by a second exponent value and a second mantissa value; and a data storage medium operative to store the codes.

28. The computer program product of claim 27, wherein the code checks only the exponent of the preliminary result to determine whether the preliminary result falls within the first or second range of denormalized values.

29. A computer program product for performing a floating-point operation, comprising:

code that directs reception of one or more input operands for the floating-point operation;

code that processes the one or more received operands to provide a preliminary result;

code that determines whether the preliminary result is within a first or second range of values, wherein the first range of values includes values greater than zero and less than half of a minimum normalized floating-point number, and wherein the second range of values includes values equal to or greater than half of the minimum normalized floating-point number and less than the minimum normalized floating-point number;

code that sets the preliminary result to zero if it is within the first range of values;

code that sets the preliminary result to the minimum normalized floating-point number if it is within the second range of values; and a data storage medium operative to store the codes.

30. An article of manufacture comprising:

computer-readable program code that causes a computer to describe an operand processing section, wherein the operand processing section is operative to, for each floating-point operation, receive and process one or more input operands for the floating-point operation to provide a preliminary result comprised of a mantissa and an exponent;

computer-readable program code that causes a computer to describe an operand flush section, wherein the operand flush section is operative to check at least the exponent of the preliminary result to determine whether the preliminary result falls within one of a plurality of ranges of denormalized values between zero and a minimum normalized floating-point number, $a_{min}$, and to set the preliminary result to one of a plurality of set values if the preliminary result falls within one of the plurality of ranges of denormalized values, wherein each range of denormalized values is associated with a respective set value defined by a particular exponent value and a particular mantissa value, and wherein the preliminary result is set, if at all, to the set value associated with the range of denormalized values within which the preliminary result falls; and a computer-usable medium configured to store the computer-readable program codes.

31. An article of manufacture comprising:

computer-readable program code that causes a computer to describe a memory unit, wherein the memory unit is operative to store instructions;

computer-readable program code that causes a computer to describe an instruction dispatch unit, wherein the instruction dispatch unit is operative to retrieve instructions from the memory unit;

computer-readable program code that causes a computer to describe a floating-point unit (FPU), wherein the FPU couples to the instruction dispatch unit and is operative to perform a floating-point operation on one or more input operands to provide a preliminary result comprised of a mantissa and an exponent, check at least the exponent of the preliminary result to determine if the preliminary result falls within a first or second range of denormalized values between zero and a minimum normalized floating-point number, $a_{min}$, flush the preliminary result to zero if the preliminary result falls within the first range of denormalized values, and set the preliminary result to a set value if the preliminary result falls within the second range of denormalized values, wherein the set value is defined by a particular exponent value and a particular mantissa value; and a computer-usable medium configured to store the computer-readable program codes.

32. A computer data signal embodied in a transmission medium comprising:

computer-readable program code that causes a computer to describe an operand processing section, wherein the operand processing section is operative to, for each floating-point operation, receive and process one or more input operands for the floating-point operation to provide a preliminary result comprised of a mantissa and an exponent; and computer-readable program code that causes a computer to describe an operand flush section, wherein the operand flush section is coupled to the operand processing section and operative to check at least the exponent of the preliminary result to determine whether the preliminary result falls within one of a plurality of ranges of denormalized values between zero and a minimum normalized floating-point number, $a_{min}$, and to set the preliminary result to one of a plurality of set values if the preliminary result falls within one of the plurality of ranges of denormalized values, and wherein each range of denormalized values is associated with a respective set value defined by a particular exponent value and a particular mantissa value, and wherein the preliminary result is se, if at all, to the set value associated with the range of denormalized values within which the preliminary result falls.

* * * * *

UNITED STATES PATENT AND TRADEMARK OFFICE
CERTIFICATE OF CORRECTION

PATENT NO. : 6,996,596 B1
APPLICATION NO. : 09/577238
DATED : February 7, 2006
INVENTOR(S) : Ho et al.

It is certified that error appears in the above-identified patent and that said Letters Patent is hereby corrected as shown below:

On Title Page Item 57

In the Abstract, line 16, please change "+an" to -- $+a_{min}$ --

Column 5, line 18, please change "130, IXU" to -- 130. IXU --

Column 5, line 44, please change "PEP" to -- PIP --

Column 9, line 48, please change "$+a_{min}$" to -- $+a_{max}$ --

Column 9, line 49, please change the second "$+a_{min}$" to -- $+a_{max}$ --

Column 9, line 65, please change "Fin" to -- $E_{min}$ --

Column 11, line 12, please change "selected-to" to -- selected to --

Column 11, line 25, please change the second "$\pm a_{min}/4$" to -- $\pm 3a_{min}/4$ --

Column 12, line 53, please change "Gamins" to -- $+a_{min}$ --

Column 13, line 36, please change the second "$\pm a_{min}/4$" to -- $\pm 3a_{min}/4$ --

Column 14, line 56, please change "E" to -- $E_{pre}$ --

Column 14, line 59, please change "E" to -- $E_{pre}$ --

Column 15, line 14, please change "$0<M<+an/2$" to -- $0< |y| < +a_{min}/2$ --

Column 16, line 30, please change "gamin" to -- $\pm a_{min}$ --

Column 18, line 11, please delete "flat"

UNITED STATES PATENT AND TRADEMARK OFFICE
CERTIFICATE OF CORRECTION

PATENT NO.       : 6,996,596 B1
APPLICATION NO.  : 09/577238
DATED            : February 7, 2006
INVENTOR(S)      : Ho et al.

It is certified that error appears in the above-identified patent and that said Letters Patent is hereby corrected as shown below:

Claim 32, column 24, line 56, please change "se" to -- set --

Signed and Sealed this

Nineteenth Day of December, 2006

JON W. DUDAS
*Director of the United States Patent and Trademark Office*